United States Patent [19]
Bickford

[11] 4,074,881
[45] Feb. 21, 1978

[54] TRIPOD ASSEMBLY

[75] Inventor: Gardner Lloyd Bickford, Palos Verdes Estates, Calif.

[73] Assignee: James R. Vickery, La Mesa, Calif.

[21] Appl. No.: 698,967

[22] Filed: June 23, 1976

[51] Int. Cl.$^2$ ............................................. F16M 11/20
[52] U.S. Cl. ................................. 248/188.7; 248/435; 248/170; 248/525
[58] Field of Search ..................... 248/188.7, 525, 526, 248/166, 434, 435, 168, 169, 170, 171, 431

[56] References Cited

U.S. PATENT DOCUMENTS

| | | | |
|---|---|---|---|
| 2,283,324 | 5/1942 | Faber | 248/188.7 |
| 2,772,788 | 12/1956 | Gill | 248/170 |
| 3,327,980 | 6/1967 | Rasmussen | 248/168 |
| 3,618,111 | 11/1971 | Vaughn | 248/166 |

FOREIGN PATENT DOCUMENTS

| | | | |
|---|---|---|---|
| 1,284,636 | 12/1968 | Germany | 248/166 |
| 1,055,347 | 4/1959 | Germany | 248/188.7 |

*Primary Examiner*—Robert A. Hafer
*Attorney, Agent, or Firm*—Lyon & Lyon

[57] ABSTRACT

A tripod assembly for receiving and holding a standard carrying a load such as a chair, a camera, etc., having a bearing ring with a tapered inner diameter for receiving and carrying the load bearing standard; first, second, and third legs rotatably carried by downwardly extending hinge eyes from said bearing ring and terminating in one end in foot pads and in another end in hinge eyes for cooperation with the downwardly extending hinge eyes and a squared edge for communication with linear recesses in the bottom portion of said bearing ring.

1 Claim, 3 Drawing Figures

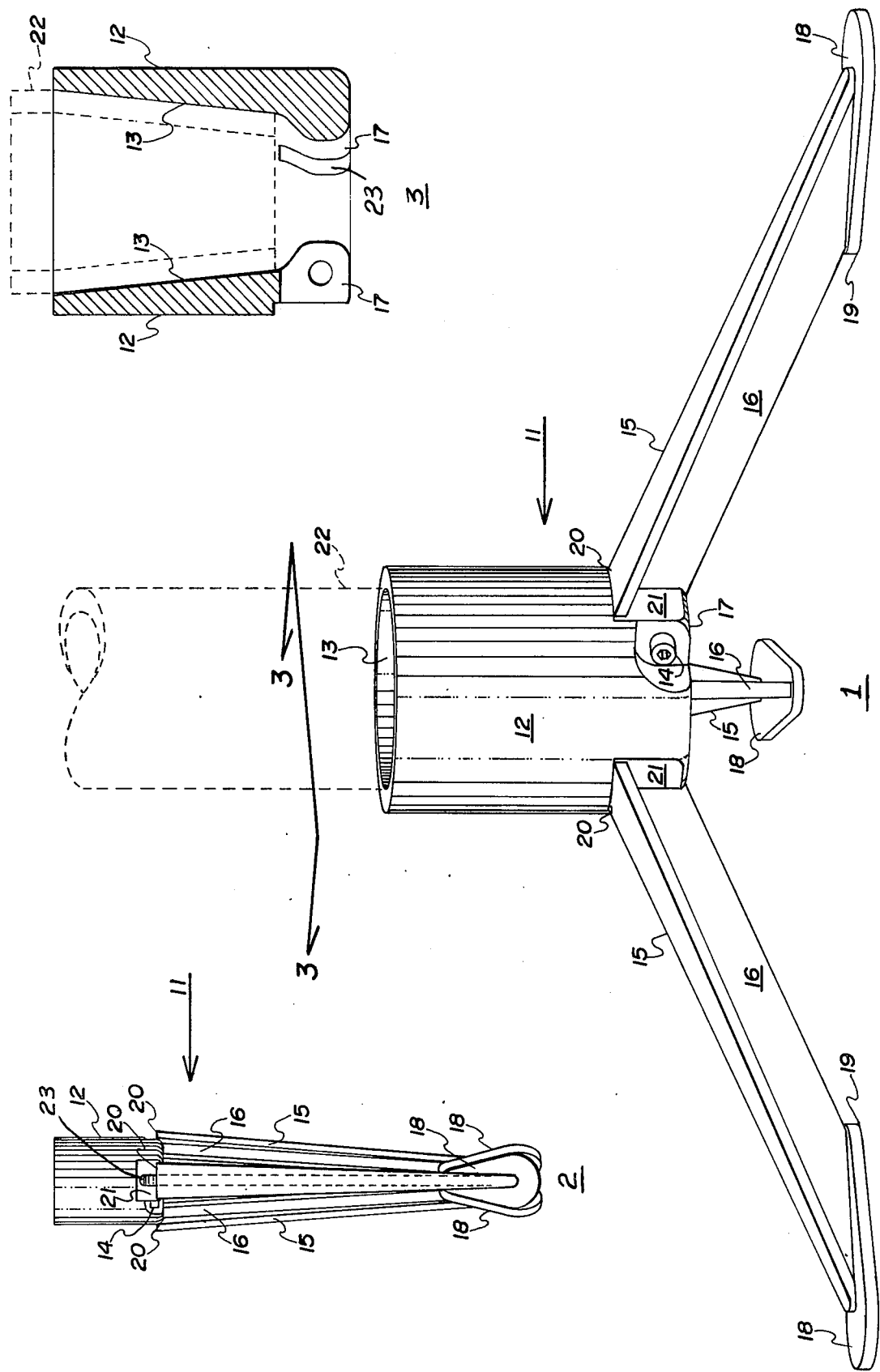

TRIPOD ASSEMBLY

BRIEF DESCRIPTION OF THE INVENTION

The present invention relates to a tripod assembly and, more particularly, to a tripod assembly having a positively defined upright position.

According to the invention, a tripod assembly is provided in which a bearing ring dimensioned for receiving a load bearing standard is hingedly coupled at the bottom portion thereof to three legs, each terminating in a flattened foot pad portion or pod on one end and having a squared flat surface bearing portion at another end dimensioned for cooperation with flat surface recesses in the outside walls of the bearing ring for effecting a positive limit or positioning in its upright operable position.

When the assembly is lifted off its bearing surface, three legs rotate downwardly to a vertical position under the bearing ring. The legs are hingedly coupled to the bearing rings at downwardly extending mounting eyes, each having an outer surface flush with a different recess, which allows for an extremely compact folded position for shipping, storage, etc.

An object of the present invention is the provision of an improved tripod assembly.

Another object of the invention is the provision of a tripod assembly having a positive upright positioning.

A further object of the invention is the provision of a tripod assembly which folds to an extremely compact position.

Yet another object of the invention is the provision of a tripod assembly which is inexpensive to manufacture and assemble and extremely convenient in use.

Other objects and many of the attendant advantages of the present invention will be readily appreciated as the same becomes better understood by reference to the following detailed description when considered in connection with the accompanying drawings in which like reference numerals designate like parts throughout the Figures thereon and wherein:

FIG. 1 is a perspective view of the preferred embodiment of the present invention in its upright position;

FIG. 2 is a perspective view of the embodiment of FIG. 1 in a folded position; and FIG. 3 is a cross-sectional view taken along lines 3—3 of FIG. 1.

DETAILED DESCRIPTION OF THE DRAWING

Referring to FIGS. 1, 2, and 3, a bearing ring 11 has an outside wall 12 and an inside wall 13. Hinge extensions 17 are hingedly attached to legs 16 at axle members 14. Axle members 14 can be of any conventional construction. Legs 16 have a T-shaped cross-section with a flat top portion 15 and terminate in flattened foot pads 18. Foot pads 18 have extended bottom surface 19. Flat surfaced recesses 21 cooperate with flat terminating surface 20 on top member 15 in forming a bearing contact. A standard 22 is (shown in phantom) being received by bearing ring 12. Inner wall 13 of bearing ring 11 is tapered to more firmly contact and support standard 22.

It can be seen that through the use of T-shaped legs 16 and the abutment of flat top member 15 with flat recess 21, the upper limit of leg rotation is set in a very stable manner as well as enhancement of inherent structural strength in the entire unit.

It can also be seen with reference to FIG. 2 that when folded for storage, the recesses 21 together with the inwardly and downwardly extending hinge members 17, the entire unit is in convenient form for shipping and storing.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:

1. A tripod assembly for receiving and carrying a load bearing standard, comprising a bearing ring having an inner diameter dimensioned for receiving a load bearing standard and being generally cylindrical in shape;

hinge extensions extending downwardly and inwardly from said bearing ring, said hinge extensions including radially extending slots therethrough, each said slot including a substantially flat surfaced recess extending perpendicularly relative to said slot, each said flat surfaced recess extending as a cord across said generally cylindrical bearing ring and being outwardly of one of said slots; and three legs rotatably carried by said hinge extensions, each said leg including a vertically oriented portion extending into one of said slots and a horizontally oriented flat portion above said vertically oriented portion outwardly from said slot and dimensioned for abutment with one of said substantially flat surfaced recess when said leg is rotated in an extended position.

* * * * *